United States Patent Office 2,975,214
Patented Mar. 14, 1961

2,975,214

PROCESS FOR THE MANUFACTURE OF PROTO-
CATECHUIC ALDEHYDE

Jonas Kamlet, New York, N.Y., assignor to Crown Zellerbach Corporation, San Francisco, Calif., a corporation of Nevada No Drawing. Filed Mar. 5, 1959, Ser. No. 797,351

5 Claims. (Cl. 260—600)

This invention relates to an improved process for the manufacture of protocatechuic aldehyde. More particularly, it relates to an improved process for the conversion of vanillin to protocatechuic aldehyde (3,4-dihydroxybenzaldehyde) in good yield. Vanillin may be prepared inexpensively and in large quantities from plentiful industrial wastes and by-products of the pulp and paper industries (such as woodflour, sawdust, sulfite waste liquor, calcium lignosulfonate, alkali lignin, etc.) by alkaline scission and oxidative processes.

Protocatechuic aldehyde forms crystals, melting at 153°–154° C., poorly soluble in cold water, readily soluble in hot water, ether, boiling alcohol, poorly soluble in hot toluene and insoluble in cold toluene. It is a valuable intermediate for the synthesis of a number of important pharmaceutical, flavoring, perfumery, antioxidant and dyestuff intermediates, such as heliotropine (piperonal), epinephrine (adrenaline), syringaldehyde, veratraldehyde, mescaline, et cetera.

The most important industrial use of protocatechuic aldehyde is as an intermediate in the manufacture of bourbonal (ethyl vanillin, 3-ethoxy, 4-hydroxybenzaldehyde). Bourbonal possesses a finer and more intense vanilla odor and taste than does vanillin. The aroma of bourbonal is richer than that of vanillin and it "stays" longer. In flavoring and perfumery practice, bourbonal has three to four times the strength of vanillin. It is widely used under the names of ethavan, vanillose, ethyl vanillin and vanirome. In co-pending patent application S.N. 516,796 (now issued as U.S. Patent 2,878,292), I have described an improved process for the conversion of protocatechuic aldehyde to bourbonal. A commercially feasible method for the preparation of protocatechuic aldehyde is an integral requirement for the successful operation of this process. It is therefore the purpose of this invention to provide an inexpensive method for the demethylation of vanillin to form protocatechuic aldehyde.

Protocatechuic aldehyde has heretofore been prepared: (a) by the Riemer-Tiemann method starting with catechol (Riemer and Tiemann, Berichte 9, 1269 (1876); Tiemann and Koppe, Berichte 14, 2015 (1881); Reihlen, Illig and Wittig, Berichte 58, 18 (1925); (b) by various methods involving the oxidation of protocatechuyl alcohol (Gugy & Co., German Patent 105,998); (c) by the oxidation of m- or p-hydroxybenzaldehyde with hydrogen peroxide (Sommer, German Patent 155,731); (d) by the alkaline hydrolysis of 3-halo, 4-hydroxybenzaldehydes (Baum, German Patent 82,078; Boehringer, German Patent 269,544); (e) by the demethylation of veratraldehyde (Dreyfus, German Patent 193,958); (f) by various methods involving the splitting of the methylenedioxy bridge in piperonal (Fittig and Remsen, Annalen 168, 97 (1873), Dreyfus, German Patent 193,958; Fritsche & Co., German Patents 166,358 and 162,822; Schimmel & Co., German Patent 165,727, Wigscheider, Monatshefte 14, 383 (1893); Weisse, Berichte 43, 2605 (1910); Hoering and Baum, Berichte 41, 1914 (1908); Hamburger, German Patent 278,778; Schmidt, German Patent 295,337; Delange, Bull. Soc. Chem. (1908), 509; Schimmel & Co., German Patent 223,643; Murai, Sci. Rep. Tohoku Univ. 14, 153; Buck and Zimmermann, Organic Syntheses 18, 75 (1938); Hamburger, German Patent 339,945). (g) The demethylation of vanillin by digestion with hydrochloric acid at advanced temperatures and pressures gives very poor yields of protocatechuic aldehyde and considerable amounts of resinous material (Thiemann and Harmann, Berichte 7, 620 (1874), while the use of phosphorus pentachloride for this reaction gives similarly poor yields and is economically unfeasible (Freudenberg and Hiel, Berichte 86, 192 (1953).

Pearl and Beyer (Journ. Amer. Chem. Soc. 75, 2630–2633 (1953)) have described a method for the demethylation of vanillin to form protocatechuic aldehyde in good yield, employing anhydrous aluminum bromide. This reagent is relatively expensive and is required in such quantities as to make its use in the preparation of protocatechuic aldehyde economically unattractive. The use of the cheaper aluminum chloride in the demethylation of vanillin gives relatively poor yields of protocatechuic aldehyde and considerable resin and tar formation.

The basis of this invention is the finding that vanillin can be demethylated by the use of a reagent consisting of a complex of probable composition: $Ar(Al_nBr_{3n-1})HBr$ where Ar is a member of the group consisting of aryl, alkyl-aryl and nitro-aryl and $n$ is an integer from 1 to 5, said reagent being made by the reaction of elemental bromine with elemental aluminum in a solvent of composition ArH, to form protocatechuic aldehyde in good yield.

It is known that anhydrous aluminum bromide will form complexes with a very wide range of inorganic and organic compounds (e.g. aliphatic, aromatic and heterocyclic ethers, dioxane, cyanogen bromide, amines, acyl halides, alkali halides, phosphorus oxychloride, ketones, esters, alcohols, titanium alkoxides, ammonium bromide, lead bromide, zinc bromide, hydrogen sulfide, helium-group gases, quinoline, aromatic hydrocarbons, aromatic nitro compounds, etc.). Of this extensive series of complexes, I have found only one group which will effectively serve to demethylate vanillin to protocatechuic aldehyde and that is the group made by the reaction of bromine with aluminum in the presence of a member of the group consisting of the aromatic hydrocarbons and nitro derivatives thereof, i.e. compounds of general formula ArH where Ar has the significance above indicated. The reaction involved is:

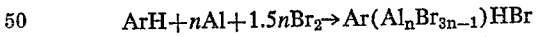

$$ArH + nAl + 1.5nBr_2 \rightarrow Ar(Al_nBr_{3n-1})HBr$$

While such complexes may be made by the reaction of anhydrous $AlBr_3$ with ArH, it has never previously been shown that these complexes could be prepared by the direct interaction of elemental bromine with elemental aluminum in the presence of ArH.

These complexes are believed to consist of "pi" molecules, the "pi" electrons of the aromatic or nitro-aromatic ring donating to a vacant orbital in the acceptor aluminum atom. (Brown and Frith, Proc. Acad. Sc. Indiana 63, 140–2 (1953); Brown et al. Ind. Eng. Chem. 45, 1462–9 (1953); Brown and Wallace, Journ. Amer. Chem. Soc. 75, 6265–8 and 6268–74 (1953); Plotnikov and Gratsianski, Bull. Acad. Sc. URSS, Classe Sci. Chem. 1947, 101–4; de Bataafsche Petroleum Maat., British Patent 732,476; Mezhennyi, J. Gen. Chem. USSR 16, 447–450 (1946).)

These complexes are highly polar in nature and the ionic nature of the complexes are such as to effect a rapid demethylation of the vanillin. It must be emphasized that these complexes are not mere solutions of aluminum bromide, and that these complexes differ considerably from aluminum bromide in physical composition and properties and in the mode of reaction, degree of reactivity, polarity, etc.

Aluminum bromide is made by the reaction of elemental bromine with elemental aluminum in a solvent which most emphatically does not form a complex with the $AlBr_3$, such as hexane, carbon disulfide, etc. (Bell, Journ. Chem. Soc. 1932, 338–9; Nicholson, Winter and Fineberg, Inorganic Syntheses III, 30–6 (1950); Houston and Oblad (to Socony-Vacuum Oil Co.)—U.S. Patent 2,439,737 (1948)). The complexes of composition $Ar(Al_nBr_{3n-1})HBr$ cannot be dissociated or decomposed to give anhydrous aluminum bromide. At advanced temperatures, these will almost invariably evolve HBr and form oily polymers of $Ar(Al_nBr_{3n-1})$ of complex composition. However, these complexes of compositions $Ar(Al_nBR_{3n-1})HBr$, in view of their highly ionic nature, are considerably more reactive than mere solutions of $AlBr_3$ in non-complex-forming solvents, especially in the demethylation of vanillin.

The complexes of composition $Ar(Al_nBr_{3n-1})HBr$ used in the process of this invention are formed by adding bromine as a liquid, or passing gaseous or vaporized bromine into a well agitated suspension of metallic aluminum in a compound of general formula ArH (where Ar has the significance above indicated) at a temperature between 0° and 50° C. Above 50° C., there is a tendency for the complex to dissociate with evolution of HBr. Below 0° C., the reaction mixture tends to solidify and the reaction is interrupted. The aluminum metal is preferably added in a finely divided or comminuted form, and may be derived from any convenient source, such as primary metal, secondary metal, scrap, dross, turnings, filings, powder, dust, et cetera. Typical examples of the complexing ArH components are benzene, toluene, meta-xylene, para-xylene, para-cymene, cumene, naphthalene, nitrobenzene, o-nitrotoluene, nitro-m-xylene, o-nitro-p-cymene, et cetera.

I have also found that the reaction between the aluminum and the bromine is considerably accelerated if the aluminum employed is superficially activated with mercury or copper. This activation may be effected by first washing the aluminum with a dilute aqueous alkali solution (to remove superficial aluminum oxide), then washing free of the alkali, then immersing the aluminum for several minutes in a dilute solution of a soluble salt of mercury or copper (e.g. $HgCl_2$, $CuSO_4$), then filtering off, washing and drying the aluminum.

The reaction between the vanillin and the complex of composition $Ar(Al_nBr_{3n-1})HBr$ is effected by mixing the reagents at a temperature between 0° C. and the reflux temperature of the ArH evolved by the reaction:

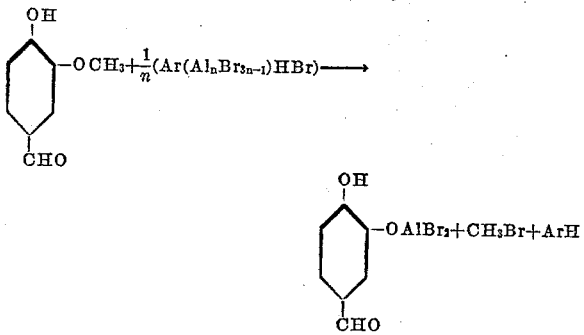

or, effectively, at a temperature between 0° C. and 120° C. Methyl bromide is evolved during this reaction and a complex of composition

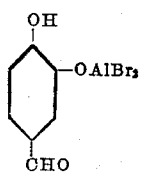

is formed. The latter complex is then decomposed with water, and the protocatechuic aldehyde is recovered from the decomposition product:

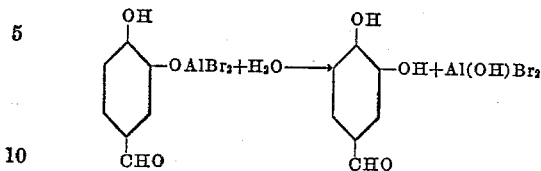

by the well known processes of the art. The yields of protocatechuic aldehyde vary with the amount of the $Ar(Al_nBr_{3n-1})HBr$ complex employed. The following yields are obtained:

| Moles of $Ar(Al_nBr_{3n-1})HBr$ per n moles Vanillin | Yields of Protocatechuic Aldehyde, Percent of theory |
| --- | --- |
| 1.0 | 62 |
| 1.5 | 71 |
| 2.0 | 89 |
| 2.5 | 91 |
| 3.0 | 92 |

The aqueous residues of this process, after the separation and recovery of the protocatechuic aldehyde, contain all of the original bromine used in making the complex (except for such bromine as is recovered as methyl bromide), in the form of an inorganic bromide. From these aqueous residues, elemental bromine is very readily recovered and recycled to the process. This is very readily effected by chlorinating or oxidizing the acidified aqueous residues, separating the elemental bromine which forms and aerating or steaming out such dissolved bromine as is not recovered by separation (Chem. and Met. Eng. 52, #10, 134 (1945); Robertson, Ind. Eng. Chem. 34, 133 (1942); Seaton, Chem. and Met. Eng. 38, #11, 638 (1931); Gale and Pearson, U.S. Patent 2,251,353 (1941). Any of the well known processes of the prior art is suitable for this bromine recovery. The bromine is recovered moist and may, if desired, be dried (e.g. with conc. sulfuric acid). However, I have found that the moist bromine may be used in preparing the $Ar(Al_nBr_{3n-1})HBr$ complexes. The traces of moisture present in the bromine are completely consumed by the activated aluminum used in making the complexes. The complexes formed, even using moist bromine, are of course completely anhydrous.

Taking into account the methyl bromide (which is a valuable by-product of this process) and elemental bromine thus recovered, the total recovery of bromine per cycle is 88% to 92%. The complexing aromatic or nitro-aromatic compound is also recovered in near-quantitative yield and may be recycled to the process. Herein lies the chief commercial attractiveness of the process of this invention. Instead of employing large amounts of expensive anhydrous aluminum bromide, we are able to demethylate vanillin to protocatechuic aldehyde in good yield with the substantial consumption of minor amounts of inexpensive aluminum, small amounts of "make-up" bromine (to compensate for losses), inexpensive chlorine (for the liberation of the bromine from the aqueous residues) and other readily available inexpensive chemicals.

The vanillin used in the process of this invention may be derived from any source. Ideally suited is the crude vanillin, without further purification, obtained by the oxidative alkaline scission of lignin-containing raw materials.

The following examples are given to define and to illustrate the present invention but in no way to limit it to reagents, proportions or conditions described therein. Obvious modifications and improvements will occur to any person skilled in the art.

Example I 54.0 gms. of aluminum turnings (2.0 gm. atoms) (superficially activated with mercury) are suspended in 2.0 kgs. of dry nitrobenzene, and bromine is added slowly, and with good agitation, cooling the reaction mixture so as to keep the temperature from rising above 20° C., until a total of 480.0 gms. of bromine (6.0 gm. moles) have been added. To the resultant complex is now added, with good agitation and cooling, a solution of 152 gms. of vanillin (1.0 mole) in 600 gms. of nitrobenzene. The reaction mixture is agitated at 15°–20° C. for an hour, heated to 95° C. in the course of an hour, then is heated at 95°–100° C. for another hour, with continuous agitation. Methyl bromide is evolved during this reaction and may be condensed and recovered.

The reaction mixture is now cooled to room temperature, added to a mixture of 200 cc. of 22° Bé. hydrochloric acid and 8 kgs. of cracked ice, and agitated until the ice has completely dissolved. The aqueous phase and the nitrobenzene phase are separated. The aqueous phase is exhaustively extracted with four 500 cc. portions of ether. The nitrobenzene phase is exhaustively extracted with three 1 liter portions of 4% aqueous caustic soda. The combined alkaline extracts are acidified with conc. hydrochloric acid, cooled overnight at 0°–5° C. and the precipitated protocatechuic aldehyde filtered off. The filtrate from this precipitate is exhaustively extracted with the same four 500 cc. portions of ether previously used for extraction of the aqueous phase. The combined ether extracts are evaporated and the oily protocatechuic aldehyde recovered (which soon crystallizes) and mixed with the previously recovered protocatechuic aldehyde. The combined yield of protocatechuic aldehyde, M. Pt. 151°–153° C., is 123 gms, or 89% of theoretical.

Example II 67.5 gms. of aluminum granules (2.5 gm. atoms) (superficially activated with copper) are suspended in 3.0 kgs. of dry techn. xylene, and bromine, volatilized in a stream of air, is passed through the well agitated mixture, with cooling to keep the temperature at 15°–20° C., until a total of 600.0 gms. of bromine (7.5 gm. atoms) have been added. To the resultant complex is now added in small portions, with good agitation and cooling, a total of 152 gms. of vanillin (1.0 mole). The reaction mixture is agitated at 15°–20° C. for an hour, heated to 95° C. in the course of an hour, then is heated at 95°–100° C. for another hour with continuous agitation. Methyl bromide is evolved during this reaction, may be condensed and recovered.

The reaction mixture is now cooled to room temperature, added to a mixture of 250 cc. of 22° Bé. hydrochloric acid and 10 kgs. of cracked ice and agitated until the ice has completely dissolved. The aqueous phase and the xylene phase are separated. By processing each of these phases as described in Example I, there is recovered 126 gms. of protocatechuic aldehyde, M. Pt. 152°–153° C., or 91% of theoretical.

Methyl bromide recovery in these procedures varies from 0.60 to 0.72 mole per mole of vanillin. Inorganic bromide recovery varies from 93% to 96% with an overall bromine recovery of from 88% to 92% per cycle.

Having described my invention, what I claim and desire to protect by Letters Patent is:

1. A process for the manufacture of protocatechuic aldehyde which comprises the steps of:

(a) reacting elemental aluminum with elemental bromine in the presence of a compound of general formula ArH to obtain a complex of general formula

   $$Ar(Al_nBr_{3n-1})HBr$$

where Ar is the aryl portion of a member of the group consisting of benzene, toluene, meta-xylene, para-xylene, para-cymene, cumene, naphthalene, nitrobenzene, o-nitrotoluene, nitro-m-xylene, o-nitro-p-cymene and $n$ is an integer from one to five, at a temperature between 0° C. and 50° C.

(b) reacting 1.0 to 3.0 moles of said complex with $n$ moles of vanillin at a temperature between 0° C. and 120° C. to form an intermediate product of formula:

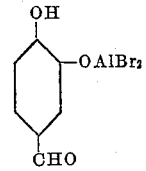

(c) reacting said intermediate product with water and
   (d) recovering protocatechuic aldehyde from the resultant reaction products.

2. The process of claim 1 in which the aluminum is activated with a metal chosen from the group consisting of mercury and copper.

3. The process of claim 1 in which 2.0 to 2.5 moles of the complex of formula $Ar(Al_nBr_{3n-1})HBr$ are reacted with $n$ moles of vanillin.

4. The process of claim 1 in which methyl bromide is recovered as a by-product from the reaction of vanillin with the complex of formula $Ar(Al_nBr_{3n-1})HBr$.

5. The process of claim 1 in which elemental bromine is recovered from the aqueous residues obtained from the reaction of the intermediate product of step (b) with water, and said bromine is returned to step (a) of said process.

References Cited in the file of this patent

UNITED STATES PATENTS

| | | |
|---|---|---|
| 2,027,148 | Carpenter et al. | Jan. 7, 1936 |
| 2,439,737 | Houston et al. | Apr. 13, 1948 |

OTHER REFERENCES

Pearl et al.: Jour. Amer. Chem. Soc., vol. 75 (1953), pp. 2630–2633.

Brown et al.: Jour. Amer. Chem. Soc., vol. 75 (1953), pp. 6265–6268.

Burwell: Chemical Review, vol. 54 (1954), pp. 654–655.